United States Patent [19]
Wolfe et al.

[11] Patent Number: 6,037,930
[45] Date of Patent: Mar. 14, 2000

[54] MULTIMODAL TOUCH SENSITIVE PERIPHERAL DEVICE

[75] Inventors: Andrew Lawrence Wolfe, Monroeville, Pa.; Gary Lloyd Barrett, Annapolis, Md.

[73] Assignee: The Whitaker Corporation, Wilmington, Del.

[21] Appl. No.: 08/839,081

[22] Filed: Apr. 23, 1997

Related U.S. Application Data

[63] Continuation of application No. 08/539,269, Oct. 11, 1995, abandoned, which is a continuation of application No. 08/261,211, Jun. 15, 1994, abandoned, which is a continuation of application No. 07/614,022, Nov. 16, 1990, abandoned, which is a continuation of application No. 07/430,961, Nov. 1, 1989, abandoned, which is a continuation of application No. 07/056,309, Jun. 1, 1987, abandoned, which is a continuation of application No. 06/904,752, Sep. 5, 1986, abandoned, which is a continuation of application No. 06/675,658, Nov. 28, 1984, abandoned.

[51] Int. Cl.$^7$ ..................................................... G09G 5/00
[52] U.S. Cl. ..................... 345/174; 178/18.05; 178/20.01
[58] Field of Search ..................................... 345/156, 157, 345/159, 160, 161, 163, 173, 174; 178/18, 18.01–20.04; 341/20, 26, 33; 273/148 B

[56] References Cited

U.S. PATENT DOCUMENTS

| | | | |
|---|---|---|---|
| Re. 28,238 | 11/1974 | Koster | 340/720 |
| 3,364,473 | 1/1968 | Reitz et al. | 340/720 |
| 3,422,418 | 1/1969 | Simoneau | 340/720 |
| 3,648,270 | 3/1972 | Metz et al. | 340/711 |
| 4,088,904 | 5/1978 | Green | 340/365 C |
| 4,119,953 | 10/1978 | Yeschick | 340/711 |
| 4,158,759 | 6/1979 | Mason | 340/711 |
| 4,186,392 | 1/1980 | Holtz | 340/365 C |
| 4,386,232 | 5/1983 | Slater | 340/712 |
| 4,394,087 | 7/1983 | Irie et al. | 340/365 C |
| 4,486,741 | 12/1984 | Nozawa et al. | 340/365 S |
| 4,649,499 | 3/1987 | Sutton et al. | 340/712 |
| 4,763,117 | 8/1988 | Blattner et al. | 340/712 |

FOREIGN PATENT DOCUMENTS

| | | | |
|---|---|---|---|
| 0142132 | 12/1978 | Japan | 340/709 |
| 0208641 | 11/1984 | Japan | 340/712 |
| 2139762 | 11/1984 | United Kingdom | 340/709 |

*Primary Examiner*—Richard A. Hjerpe
*Assistant Examiner*—M. Fatahiyar
*Attorney, Agent, or Firm*—Banner & Witcoff, Ltd.

[57] ABSTRACT

The present invention is to a touch sensitive intelligent multimodal peripheral device which includes a touch sensitive pad to which the operator applies a light pressure in a prescribed manner to effect cursor movement on a CRT screen or to input data to a computer. The device has four operating modes which are defined as the mouse mode, the absolute mode, the joystick mode and the numeric keypad mode.

15 Claims, 15 Drawing Sheets

MULTIMODAL TOUCH SENSITIVE PERIPHERAL DEVICE

This application is a continuation of application Ser. No. 08/539,269, filed Oct. 11, 1995, now abandoned which is a continuation of Ser. No. 08/261,211, filed Jun. 15, 1994 now abandoned which is a continuation of Ser. No. 07/614,022, filed Nov. 16, 1990, now abandoned which is a continuation of Ser. No. 07/430,961, filed Nov. 1, 1989, now abandoned which is a continuation of Ser. No. 07/056,039, filed Jun. 1, 1987, now abandoned which is a continuation of Ser. No. 06/904,752, filed Sep. 5, 1986, now abandoned which is a continuation of Ser. No. 06/675,658, filed Nov. 28, 1984, now abandoned.

BACKGROUND OF THE INVENTION

The present invention relates generally to the field of computer peripheral devices, and more particularly, is directed to a multimodal touch sensitive peripheral device which greatly enhances the input of information to a computer system.

In most general purpose computer systems, commands and data are entered to the system from a typewriter-style keyboard and information from the system is displayed on a CRT display or printed on a hard copy printing device. Where a CRT is used, the computer normally indicates the current entry position by displaying a distinctive marker called a cursor on the CRT screen. The cursor can take several forms but is usually a flashing underscore or rectangle or a graphical type pointer such as an arrow. The position of the cursor may be controlled in a number of ways. In some systems, a particular keystroke, or combination of keystrokes, is interpreted by the computer as a command to move the cursor to the right, left, up or down. Depending on the system and/or the particular software being used at a time, the cursor may be moved in increments of a single character position, an entire word, line, paragraph or pixel. In many systems, special keys are devoted to these functions and are usually located in a keypad separated from the typewriter keyboard.

Some systems also provide for a pointing device which can be used by the computer to control the location of the cursor on the CRT. Such devices include joysticks, paddles, light pens, touch panels, touch screens, and so-called "mice". All of these devices enable an operator to "point" at a position on the display where the cursor is to be located.

Joysticks and paddles are perhaps the most widely known pointing devices due to their widespread use in video games. These devices are usually of the analog or fixed axis type. The simplest analog joysticks comprise a pair of potentiometers mechanically coupled to a movable handle at right angles to each other. The potentiometers form part of a voltage divider network and as the handle is moved, provide analog signals representing the X and Y coordinate position of the handle. The analog signals may then be converted to digital form for processing by a computer to locate the cursor. The cursor, or other point of interest, can therefore be positioned on the CRT by manipulating the handle. The fixed axis type of joystick is usually comprised of a handle mechanically coupled to a plurality of switches. Each switch represents an axis and direction of movement of the handle. In a 8-axis joystick, 4 switches are provided which indicate handle movement along a vertical, a horizontal and two-diagonal axes. Paddles are similar in operation to joysticks but usually provide a signal indicating movement of the paddle along one axis.

One example of a joystick known in the prior art is disclosed in U.S. Pat. No. 4,313,277 issued in the name of Eder. The Eder joystick provides a pair of 4 bit logic signals which represent the X and Y coordinate axis of the joystick handle. These signals are continuously scanned by an integral microcomputer along with the logic output signals from a small keyboard. The scanned signals are serially transmitted as a modulated infrared light signal to a receiver attached to a computer for demodulation and processing.

Light pens, touch screens and touch panels represent another significant class of pointing devices. Light pen and touch screens are used to detect a desired location on a CRT screen. Light pens usually have a switch in their side or tip which the user activates when the pen is positioned at the desired location on the CRT screen. The light pen then monitors when the pixel under the pen comes on. Based on a reference time signal, the location of the pixel on the CRT screen can then be determined. Touch screens use some form of overlay on the CRT screen which when touched, indicate to the host computer a corresponding location on the screen. Touch panels provide coordinate signals which represent a contact point on the panel. The coordinate signals are usually based on some form of grid scheme.

Mice represent another type of pointing device which have gained popularity with the proliferation of personal computers. Mice sit on a flat surface, such as a table top, and are moved about by hand. In some mouse systems, the movement of wheels or bearings within the mouse are coupled to switches to provide X and Y motion signals. In other systems, the movement of wheels is used to rotate an aperture which interrupts a beam of light to provide the X and Y coordinate signals. U.S. Pat. No. 4,369,439 issued in the name of Broos, U.S. Pat. No. 3,541,541 to Engelbart and U.S. Pat. No. 3,541,521 to Koster disclose mice of the first category while U.S. Pat. No. 4,464,652 issued in the name of Lapson discloses a mouse of the latter category.

Another type of mouse uses a glass grid. A light source inside the mouse is directed toward the grid to determine how many grid lines the mouse crosses as it is moved. This information is then provided to the host computer.

While the above described pointing devices aid in the positioning of the cursor on the CRT screen, they are deficient in a number of areas. For example, analog joysticks are difficult to control, have low resolution and cannot be used to draw straight lines on a CRT screen. Fixed axis joysticks cannot be used to draw complex curves, are slow to move from one place to another and their speed cannot be controlled. Mechanical mice require a large amount of table space to operate, are difficult to maintain in proper orientation, are limited in speed and also cannot be used to draw straight lines. Moreover, mice can readily fall off the operating surface and be damaged and are prone to collection of dirt and dust in their mechanism. Optical mice share many of the same diffciencies as mechanical mice and also require a special operating surface. Light pens require special CRT monitors, are low in accuracy and are fragile in construction. Touch screens obstruct the user's view of the CRT screen and require significant arm motions, and concomitant time delay, for their use. Thus, extended use of touch screens is very fatiguing. Touch screens are also difficult to use due to parallax problems. The above described devices are also deficient in that they all require a significant amount of supervision control and interrogation by the host computer. Thus valuable computer time is used to perform relatively mundane operations. Accordingly, there is a great need in the art for a pointing device which overcomes the above described deficiencies in prior art devices while at the same time being effective, convenient and easy to use. Moreover, different applications require the use of different devices. Thus, there is also a need in the art for a universal or multimodal device to meet the needs and desires of various users and various computer programs.

SUMMARY OF THE INVENTION

It is the overall object of the present invention to provide a pressure sensitive multimodal peripheral device which greatly enhances the input and control of information to a computer system.

It is a specific object of the present invention to provide a multimodal device which provides a plurality of useful operating modes.

It is another specific object of the present invention to provide a multimodal device which is easier to operate and to interface to a host computer.

It is another specific object of the present invention to provide an intelligent multimodal device which does not significantly add to the overhead of the host computer.

It is still another object of the present invention to provide a multimodal device which is relatively small in physical size and is convenient to operate.

Manipulation of on screen data, whether graphic, words, or numbers, is a difficult process. To move or reorient data, which can be easily done visually, is currently an awkward process of typing arrow keys or confusing control sequences. The present invention allows the user to link his visual abilities to complex screen movements.

The device comprises a touch sensitive pad to which the operator applies a light pressure in a prescribed manner to effect cursor movement on a CRT screen or to input data to the computer. The device has four operating modes which may be automatically selected by the host computer or manually selected by the user.

The four modes are defined as the mouse mode, the absolute mode, the joystick mode and the numeric keypad mode. In the mouse mode, the motion of the user's finger as it is traced across the touch sensitive pad is continuously measured and is provided to the host computer as a change in X and Y, and can be termed an analog input since it integrates a series of discrete items of information which are otherwise input of a digital form coordinates, i.e., ΔX and ΔY. This information may be processed by the host computer to perform a number of useful functions. The key feature of the mouse mode is the ability to readily push the cursor to a specific location on the screen. The mouse mode does not require the user to look at the device of the invention to exactly locate his finger. The device requires only that the touch sensitive pad be touched somewhere and the user's finger be slid in the appropriate direction. Thus the user need only realize that he wants to make a change to, for example, a number in the upper right hand portion of the screen, and the cursor moved to that exact place by the user sliding his finger in the relative direction. Should the user reach the edge of the pad before the desired point is reached, he need only lift his finger from the pad and begin a new trace until the point is reached.

In the absolute mode, the CRT cursor may be made to "jump" from one position on the screen to another merely by the user touching the corresponding point on the touch sensitive pad. In this mode, each coordinate point on the pad is mapped to a point on the CRT screen. The key feature of the absolute mode is the ability to move the cursor instantly to the location desired. It also affords the ability to trace an object, draw, or re-map the touch sensitive pad into function switches for specific software.

In the joystick mode, the touch sensitive pad is divided into a plurality of areas which represent cursor direction. Cursor movement is controllable in terms of direction, speed of movement and total travel distance, again input in an analog form. To move the cursor in any of eight directions, (up, down, right, left, and the four diagonal directions), the operator touches the pad at a corresponding place. Location of the user's finger touch determines the direction of cursor movement. Speed of cursor movement is also variable. Total travel of the cursor is determined by the time duration of touch. The joystick mode enables directionally stable control of cursor movement. Such directional stability is a necessity for graphics applications. No other device in the prior art has the combined capability of drawing a straight line as well as complex curves and shapes. This is also useful in operating software that has a column-row format such as spreadsheets, accounting, financial and other business software.

In the numeric key pad mode, the touch sensitive pad in divided into a plurality of sections, each section representing a numeric value or numeric key function. The pad may also have sections which represent cursor back space and carriage return. Thus, the device of the present invention may be used to represent the keypad found in calculator-style keyboards. To enter numeric data or numeric functions to the host computer, the user need only touch the area of the pad assigned to the particular number or function.

DESCRIPTION OF THE PREFERRED EMBODIMENT

Figure 1:
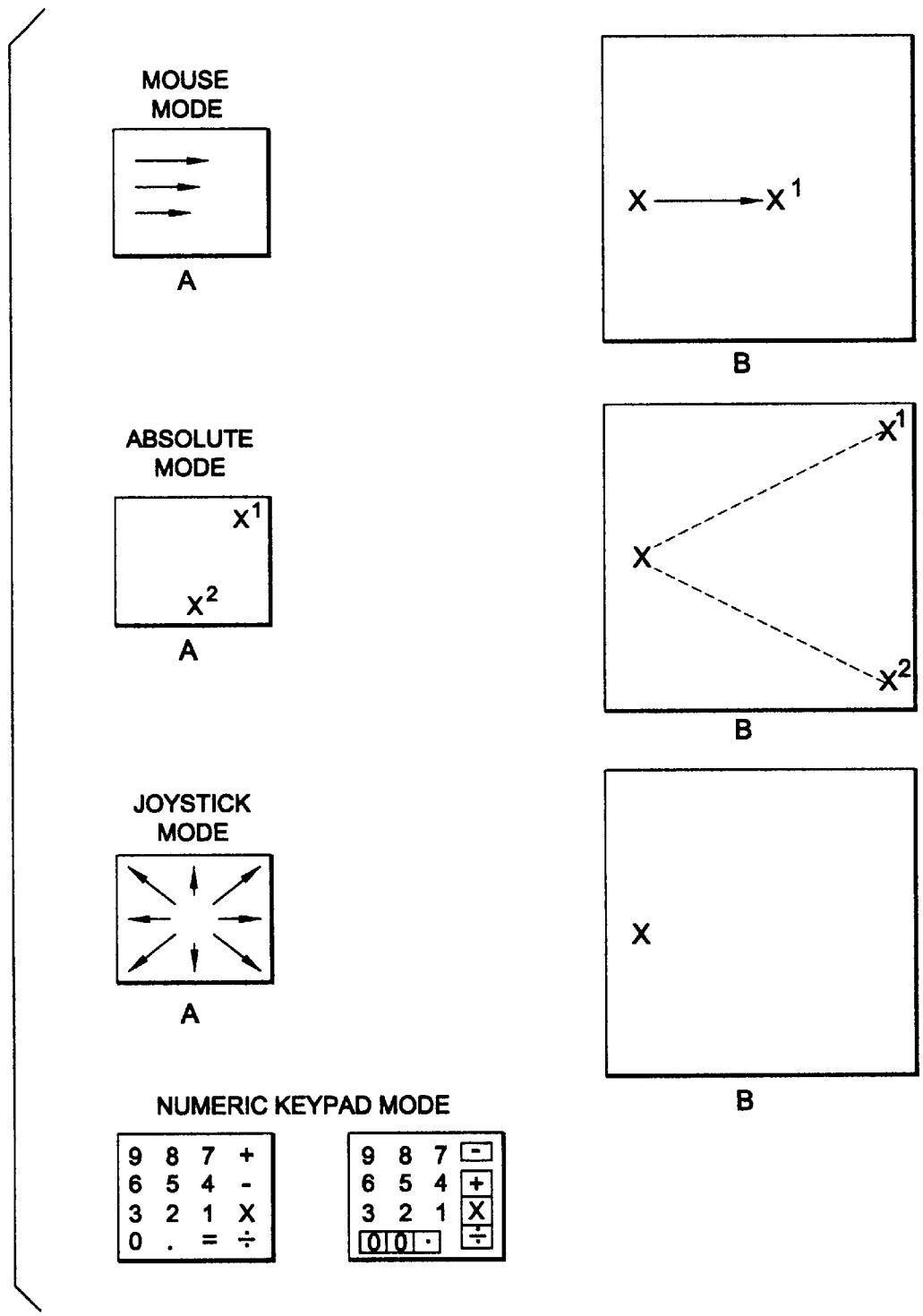
FIG. 1 is a representative illustration of the various modes of operation of the multimodal device of the present invention.

The present invention is directed to a touch sensitive multimodal peripheral device which greatly enhances the use of a computer. The device comprises a touch sensitive pad to which the operator applies a light pressure in a prescribed manner to effect cursor movement on a CRT screen or to input data to the computer. The device includes four operating modes which may be automatically selected by the host computer or manually selected by the user. These modes are illustrated in FIG. 1 of the drawings and include a mouse mode, an absolute mode, a joystick mode and a numeric keypad mode, of which absolute and numeric keypad are most usefully termed "digital" modes and mouse and joystick are most usefully termed "analog" modes. For purposes of explanation with respect to the mouse, absolute and joystick modes, the touch sensitive pad is represented by blocks A in FIG. 1 and the actual CRT screen in represented by blocks B in FIG. 1. The CRT cursor is indicated by an "X" in blocks B. With respect to the numeric keypad mode, the touch sensitive pad is divided into a plurality of sections, each section representing a numeric value or numeric key function. By touching a particular section, the associated numeric value or key function can be input to the host computer.

In the mouse mode, the motion of the user's finger as it is traced across the touch sensitive pad is continuously measured and is provided to the host computer as a change in X and Y coordinates, i.e., $\Delta X$ and $\Delta Y$. This information may be processed by the host computer to perform a number of useful functions.

In the absolute mode, the CRT cursor may be made to "jump" from one position on the screen to another merely by the user touching the corresponding point on the touch sensitive pad. In this mode, each coordinate point on the pad corresponds to a point on the CRT screen. As shown in FIG. 1 for example, in order to move cursor X to point $X^1$, the user need only touch corresponding point $X^1$ on the pad to effect the move. The cursor can be moved to point $X^2$ in a likewise manner or by tracing the finger to point $X^2$.

In the joystick mode, the touch sensitive pad is divided into a plurality of areas which represent cursor direction. This mode emulates the function of a conventional 8-axis joystick.

In the numeric key pad mode, the touch sensitive pad is divided into a plurality of sections, each section representing a numeric value or numeric key function. Thus, the device of the present invention may be used to represent the keypad found in calculator-style keyboards. To enter numeric data or numeric functions to the host computer, the user need only touch the area of the pad assigned to the particular number or function.

Figure 2:
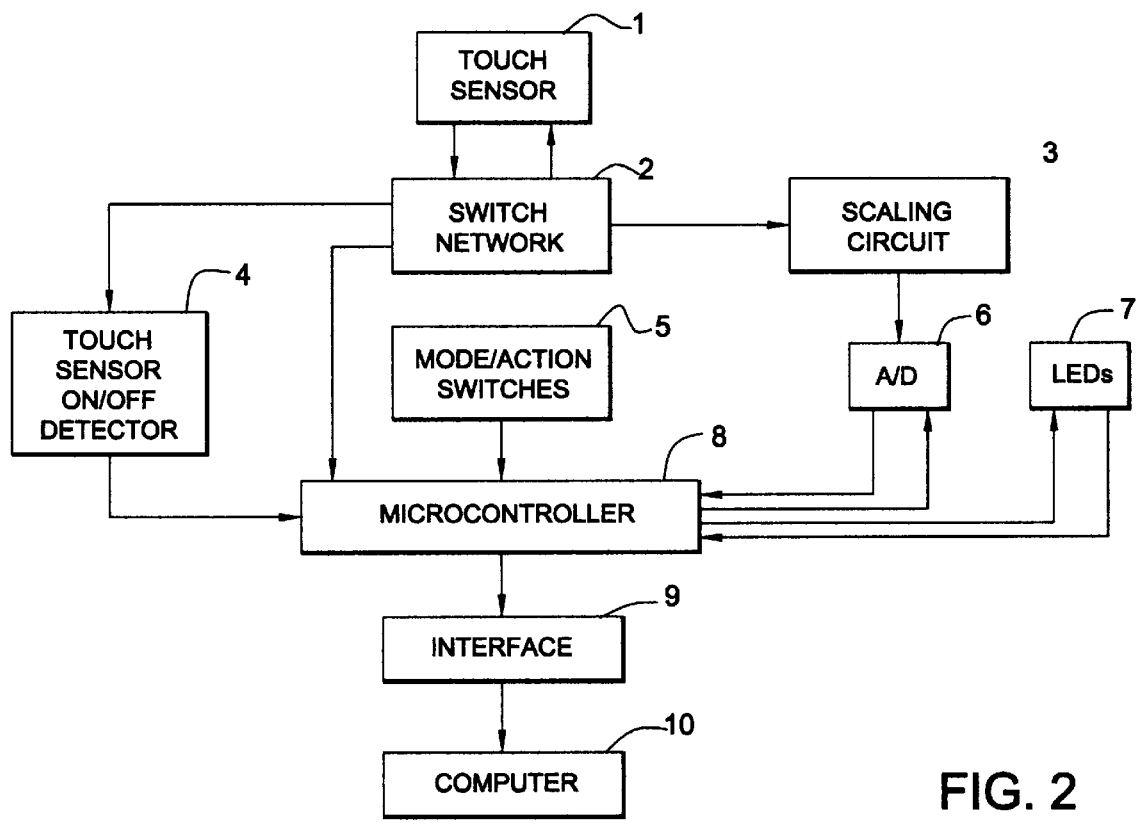
FIG. 2 is a block diagram of the multimodal device of the present invention.

With reference to the block diagram shown in FIG. 2, the construction of the multimodal touch sensitive device of the present invention will be generally described. Each of the elements shown in FIG. 1 are discussed in more detail below with reference to the remaining figures.

As shown in FIG. 2, the device comprises touch sensor pad 1 which includes a pair of close spaced parallel layers which have superposed electrically resistive and conductive portions. Sensor pad 1 forms a two dimensional plane which, in combination with switch network 2, provides analog X and Y coordinate signals representative of a position of applied pressure in the two dimensional plane. Sensor pad 1 will be described in more detail below with reference to FIGS. 3–7. Sensor pad 1 is coupled to switch network 2 which provides the appropriate bias voltages required by the pad. As will be described below with reference to FIG. 5, the X and Y coordinate signals are taken from the inactive surface of the pad at its connection point to the emitter electrodes of the PNP driver transistors. The coordinate signals from switch network 2 are supplied to scaling circuit 3. Circuit 3 is used to scale the coordinate signals to a predetermined range and also includes calibration provisions for calibrating the coordinate signals. The scaled signals are then provided to A/D convertor 6 which converts the signals to digital form for processing by microcontroller 8. Switch network 2 is also coupled to microcontroller 8. Mode/Action switches 5 comprise a plurality of membrane switches which are a part of sensor pad 1. These switches provide for manual selection of the operating modes of the multimodal device and also provide manual switch closure indications for use by the software resident in the host computer. The switches that perform the latter function are often called action switches. The host computer software often interprets their closure to indicate that it is time to perform some function. For example, in a telecommunications program, one could move the cursor over a phone number and the number could automatically be dialed when the action switch is pressed. Touch sensor on/off detector 4 is likewise coupled between switch network 2 and microcontroller 8. Detector 4 provides a logic signal to microcontroller 8 which indicates whether the pad is being touched at a particular moment. LEDs 7 are coupled to microcontroller 8 and give a visual indication to the user of the status of the multimodal device. Interface 9 is coupled to microcontroller 8 and is provided as a means for interfacing the multimodal device to computer 10. Computer 10 is a host computer which takes its input from the multimodal device. Computer 10, however, is not part of the present invention and may be virtually any digital computer known in the prior art including so-called personal or home computers. Computer 10 may be driven by an interrupt system, as is known in the art, which alerts the computer that data is available from the multimodal device and in the present invention such an interrupt system would be contained in microcontroller 8 and connected to host computer 10 through interface 9.

Figure 3:
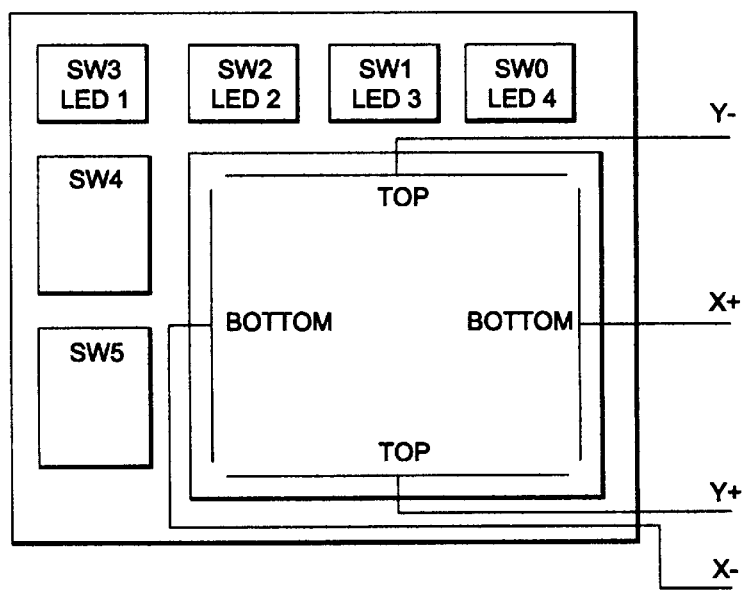
FIG. 3 is a top view of the multimodal device of FIG. 2.

FIG. 3 is a top view and partial mechanical diagram of the multimodal device of the present invention showing mode/action switches 5 of FIG. 2 (mode switches $SW_0$–$SW_3$ and action switches $SW_4$ and $SW_5$) and and LEDs 7 of FIG. 2 ($LED_1$–$LED_4$). Also shown in FIG. 3 are the electrically resistive layers of sensor pad 1 and their associated electrodes.

Figure 4:
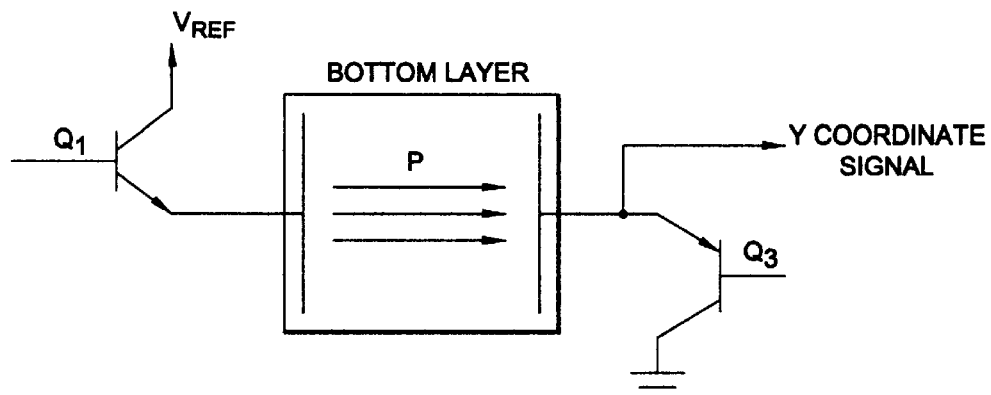
FIG. 4 is a schematic diagram showing one set of driver transistors for the touch sensitive pad used in the multimodal device of the invention.
Figure 5:
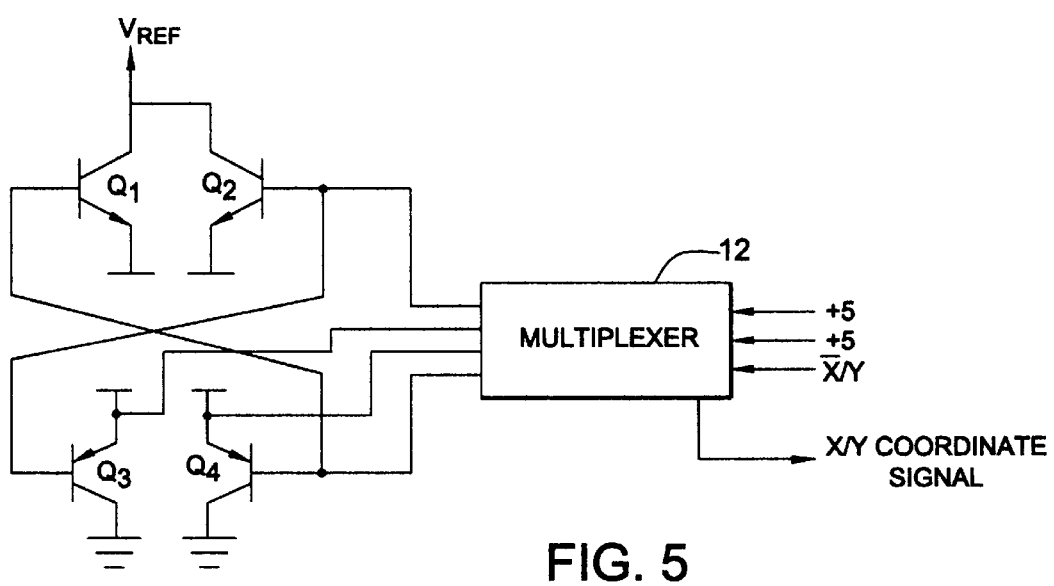
FIG. 5 is a schematic diagram showing all of the driver transistors for the touch sensitive pad used in the multimodal device of the invention.
Figure 6:
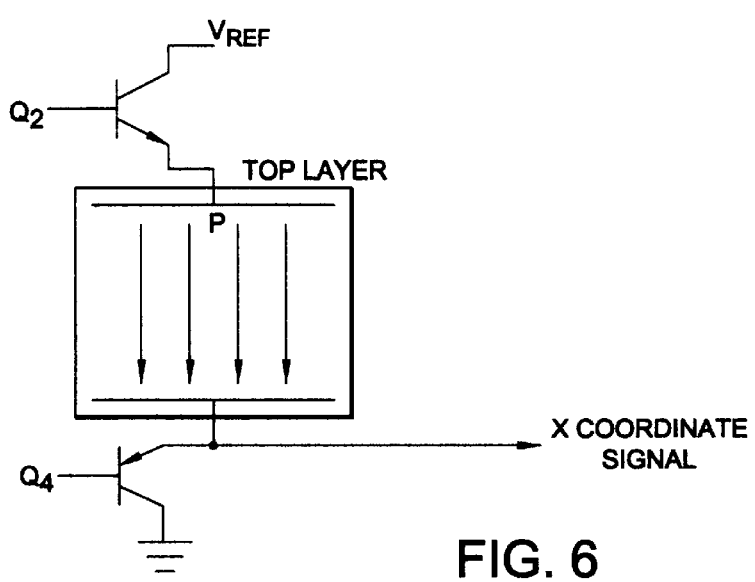
FIG. 6 is a mechanical diagram of the top layer member used to form the touch sensitive pad used in the multimodal device of the invention.

Touch sensor pad 1 comprises two close spaced parallel layers. The opposed surfaces of the layers have superposed electrically resistive portions with a respective pair of electrodes. As shown in FIGS. 4 and 6, the electrode pairs for each layer are positioned at right angles with respect to each other. The resistive portion of each layer is biased with a voltage supplied by the driver circuit shown in FIG. 5 at a predetermined frequency. The driver circuit comprises a first pair of transistors, $Q_1$–$Q_4$, and a second pair of transistors, $Q_2$–$Q_3$. The base electrodes of transistors $Q_1$ and $Q_4$ are connected together. Transistor $Q_1$ is an NPN type and transistor $Q_4$ is a PNP type. Thus, when one transistor conducts, the other is cut off. The base electrodes of NPN transistor $Q_2$ and PNP transistor $Q_3$ are similarly connected together. Each transistor pair ($Q_1$–$Q_4$ and $Q_2$–$Q_3$) is controlled by multiplexer 12 shown in FIG. 5 such that when one transistor in each pair is cut off the other transistor in each pair is turned on. This function is controlled by input line $\overline{x}/y$ of multiplexer 12. When line $\overline{x}/y$ is at a logic LO for example, transistors $Q_1$ and $Q_3$ conducts and transistors $Q_2$ and $Q_4$ are cut off. This condition reverses when input line $\overline{x}/y$ is at a logic HI. Multiplexer 12 is controlled by microcontroller 8.

Figure 7A:
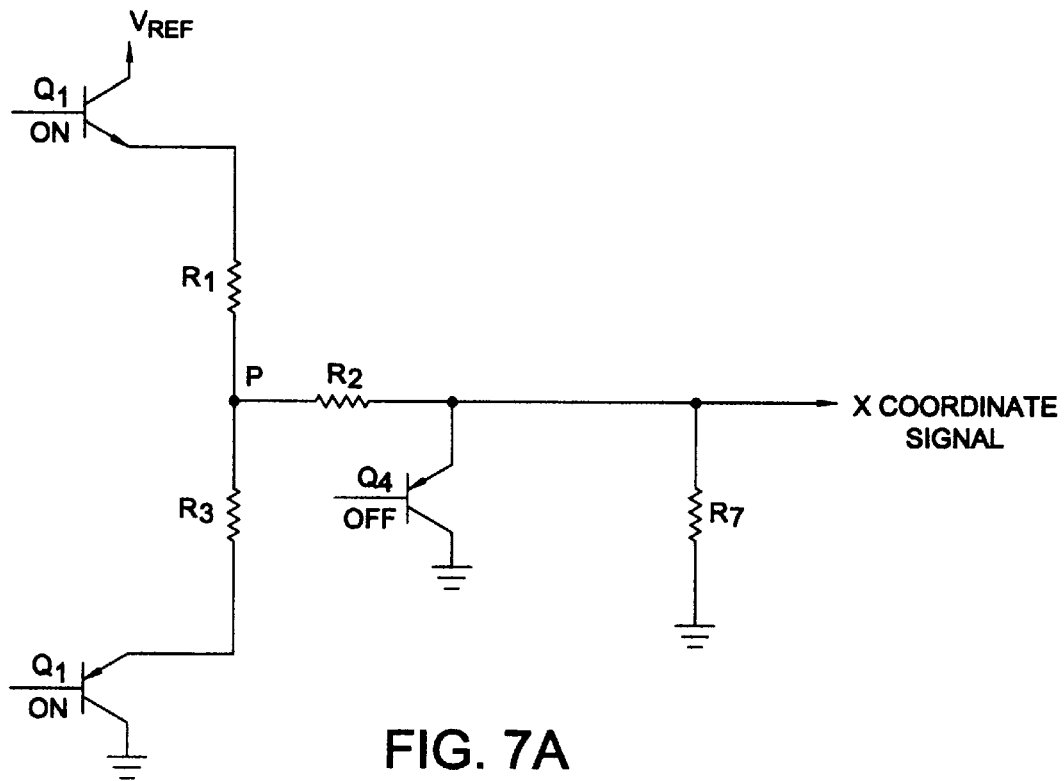
FIGS. 7A and 7B are equivalent circuit diagrams for the electrically resistive portions of the touch sensitive pad used in the multimodal device of the invention.
Figure 7B:
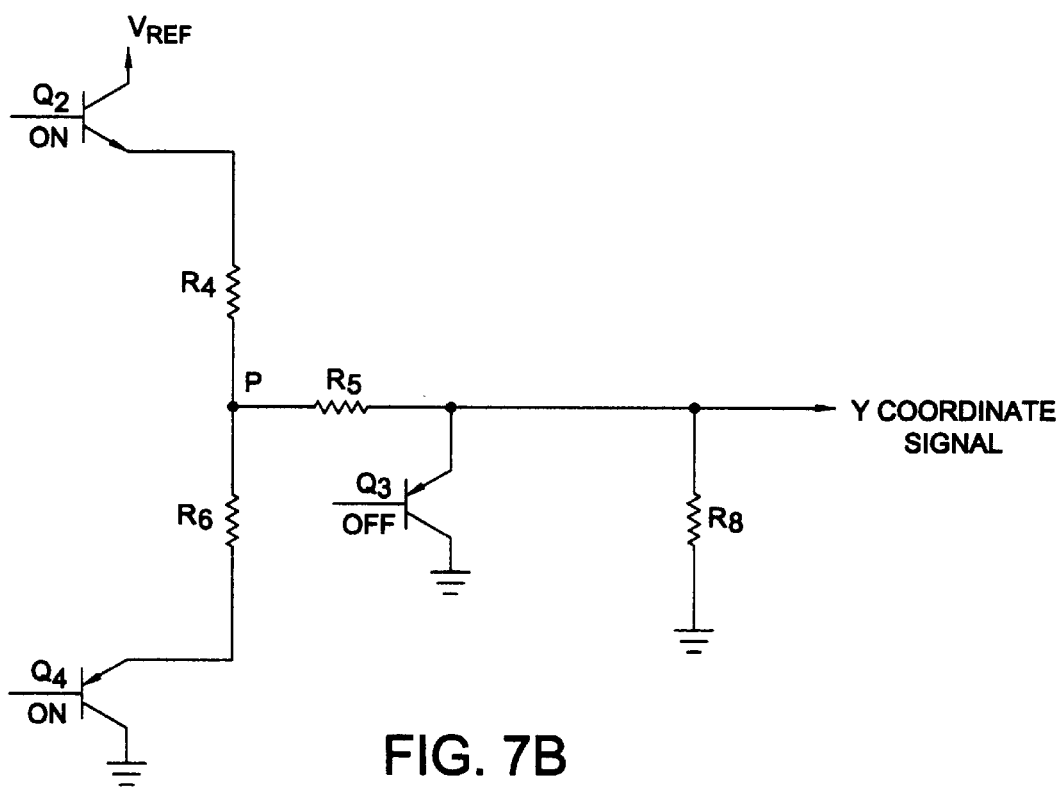

As shown in FIG. 4, transistors $Q_1$ and $Q_3$ are connected to the electrodes associated with the bottom layer of sensor pad 1. Transistors $Q_2$ and $Q_4$ are likewise connected to the electrodes associated with the top layer of sensor pad 1. Sensor pad 1 provides X and Y coordinate signals in the following manner. The X coordinate signal is produced by multiplexer 12 causing transistors $Q_1$ and $Q_3$ to conduct while transistors $Q_2$ and $Q_4$ are cut off. This causes a flow of current through the resistive portion of the bottom layer thereby forming a voltage gradient in the X or horizontal direction. When pressure is applied to sensor pad 1 to point P for example, the resistive portions of each layer comes into electrical contact at point P. Thus the equivalent circuit shown in FIG. 7A is formed with resistor $R_1$ representing the resistance between the emitter electrode of transistor $Q_1$ and point P; resistor $R_2$ representing the resistance between point P and the emitter electrode of transistor $Q_4$; and resistor $R_3$ representing the resistance between point P and the emitter electrode of transistor $Q_3$. The X coordinate signal is taken from the emitter electrode of transistor $Q_4$. The Y coordinate signal is produced by multiplexer 12 causing transistors $Q_2$ and $Q_4$ to conduct while transistors $Q_1$ and $Q_3$ are cut off. This causes a flow of current through the resistive portion of the top layer forming a voltage gradient in Y or vertical direction. The equivalent circuit shown in FIG. 7B is formed with resistor $R_4$ representing the resistance between the emitter of transistor $Q_2$ and point P; resistor $R_5$ representing the resistance between point P and the emitter electrode of transistor $Q_3$; and $R_6$ representing the resistance between point P and the emitter electrode of transistor $Q_4$. The Y coordinate signal is taken from the emitter electrode of transistor $Q_3$.

As shown in FIGS. 7A and 7B, the X and Y coordinate signals are tapped from a voltage divider network for processing by the device. The network comprises resistors $R_2$, $R_7$ and resistors $R_5$, $R_8$, respectively. The resistance value for $R_7$ and $R_8$ is selected such that substantially all of the voltage is dropped across them.

The X and Y coordinate signals are coupled to multiplexer 12 which provides one or the other coordinate signal at output terminal X/Y depending on the logic state of input terminal $\bar{x}/y$. Multiplexer 12 also includes input terminals for receiving a positive and a negative voltage. These voltages are used to drive transistors $Q_1$–$Q_4$ into hard saturation and deep cut off during their conductive and cut off states, respectively.

Figure 8:
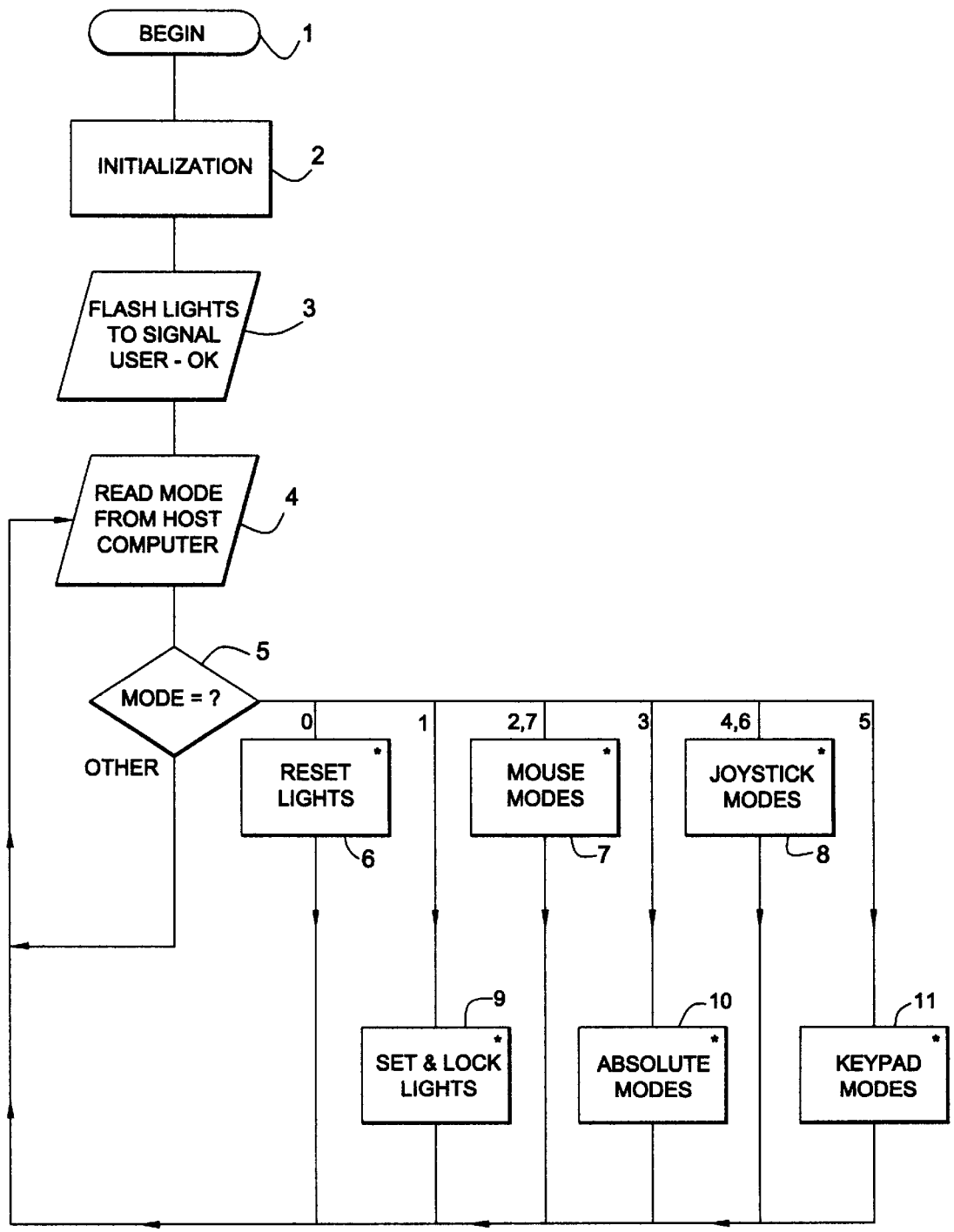
FIG. 8 is a flow chart of the main control routine for the microcontroller used in the multimodal device of the invention.

FIG. 8 is a flow chart of the main control routine in firmware used to drive microcontroller 8. The routine begins in step 1 and proceeds to step 2 where all parameters, variables and programmable hardware are initialized. After initialization, the routine proceeds to step 3 where the status indicator lamps on the face of the device are flashed several times to signal the user that the system is functioning. The routine then moves to step 4 where a mode byte is read from the host computer indicating the desired operating mode for the device. In the case where the host computer is an IBM PC, the mode byte may be read from the data buss by parallel I/O device U2 via buss transceiver U3 shown in FIG. 17B.

After the mode byte is read, the routine proceeds to step 5 where the mode byte is interpreted to determined the desired operating mode. The mode byte is arbitarily assigned to represent a particular mode. Where the mode byte represents mode "0" for example, the routine moves to block 6 where the status indicator lights are reset. The routine then executes a return to block 4. Where the mode byte represents mode "1", the routine jumps to block 9 where a light setting byte is read from the host computer and the status lamps set and locked accordingly. The routine then returns to block 4. Where the mode byte represents mode "2" or a "7", the routine jumps to block 7 and enters the mouse mode. At the conclusion of the mouse mode, the routine executes a return to block 4. Where the mode byte represents mode "3", the routine jumps to block 10 and enters the absolute or touch screen mode. At the conclusion of the touch screen mode, the routine executes a return to block 4. Where the mode byte represents a mode "4" or a mode "6", the routine jumps to block 8 and enters the joystick or cursor key mode. At the conclusion of the joystick mode, the routines execute a return to block 4. Where the mode byte represents "5", the routine jump to block 11 and enters the keypad mode. At the conclusion of the keypad mode, the routine executes a routine to block 4.

Figure 9:
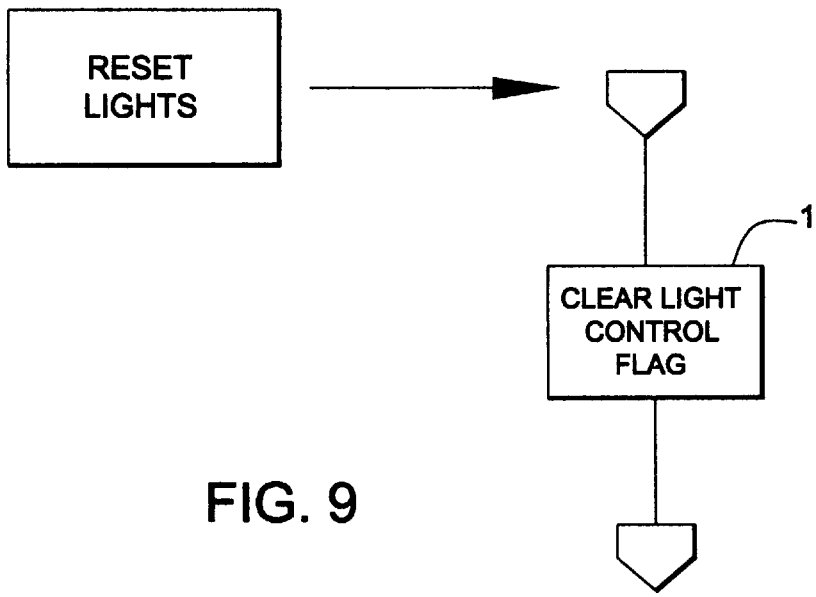
FIGS. 9–16 are flow charts of subroutines used in the main control routine illustrated in FIG. 8.

FIG. 9 is a flow chart of the reset lights subroutine identified in block 6 of FIG. 8. As shown, the control flag is cleared, thus causing the lamp to return to its quiescent state, usually off.

Figure 10:
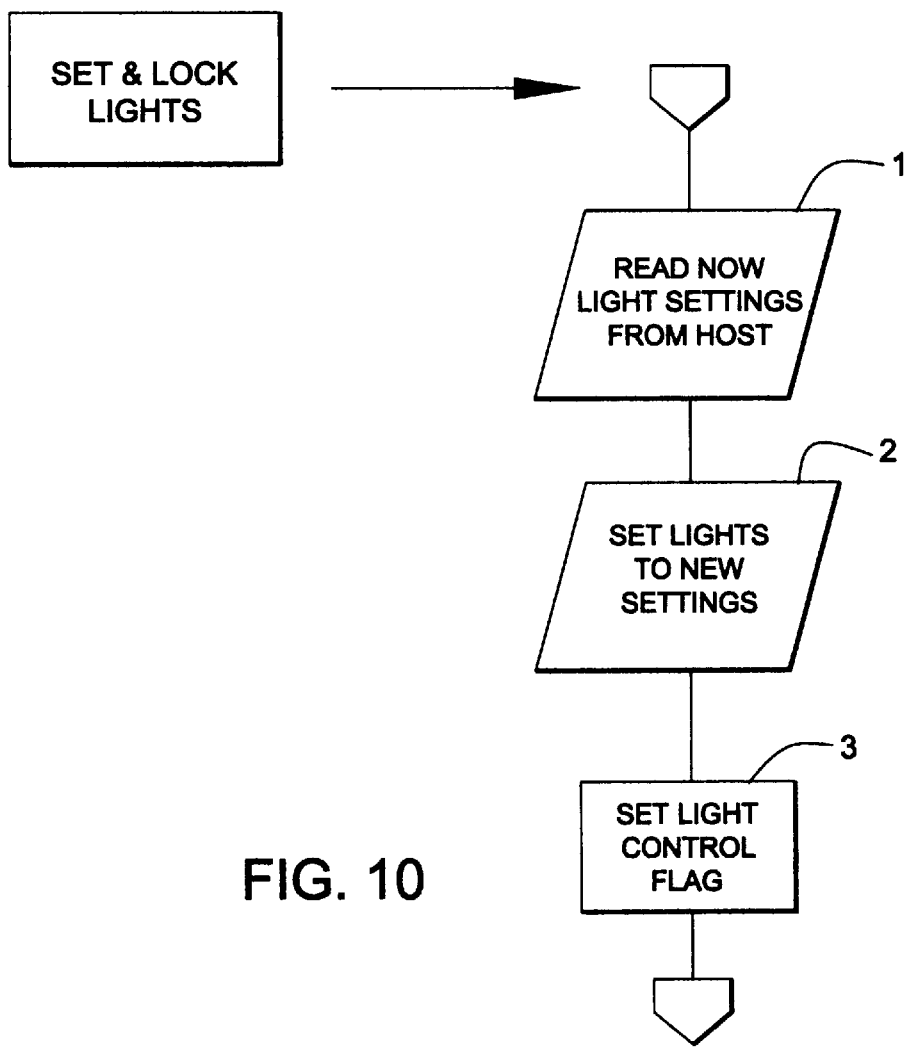

FIG. 10 is a flow chart of the lamp set and lock subroutine identified in block 9 of FIG. 8. In block 1 of the subroutine, a lamp settings byte is read from the host computer. In the case where the host computer is an IBM PC, the lamp settings byte may be read from the data buss by parallel I/O U2 via buss transeiver U3 shown in FIG. 17B. After the lamp settings byte is read, the status lamp control flag and status lamps are set accordingly. The lamp lock feature prevents the mode and corresponding status lamps from being manually changed by the user once they are set by the host computer termed "inhibiting" and represented in FIG. 10 as SET & LOCK LIGHTS.

Figure 11A:
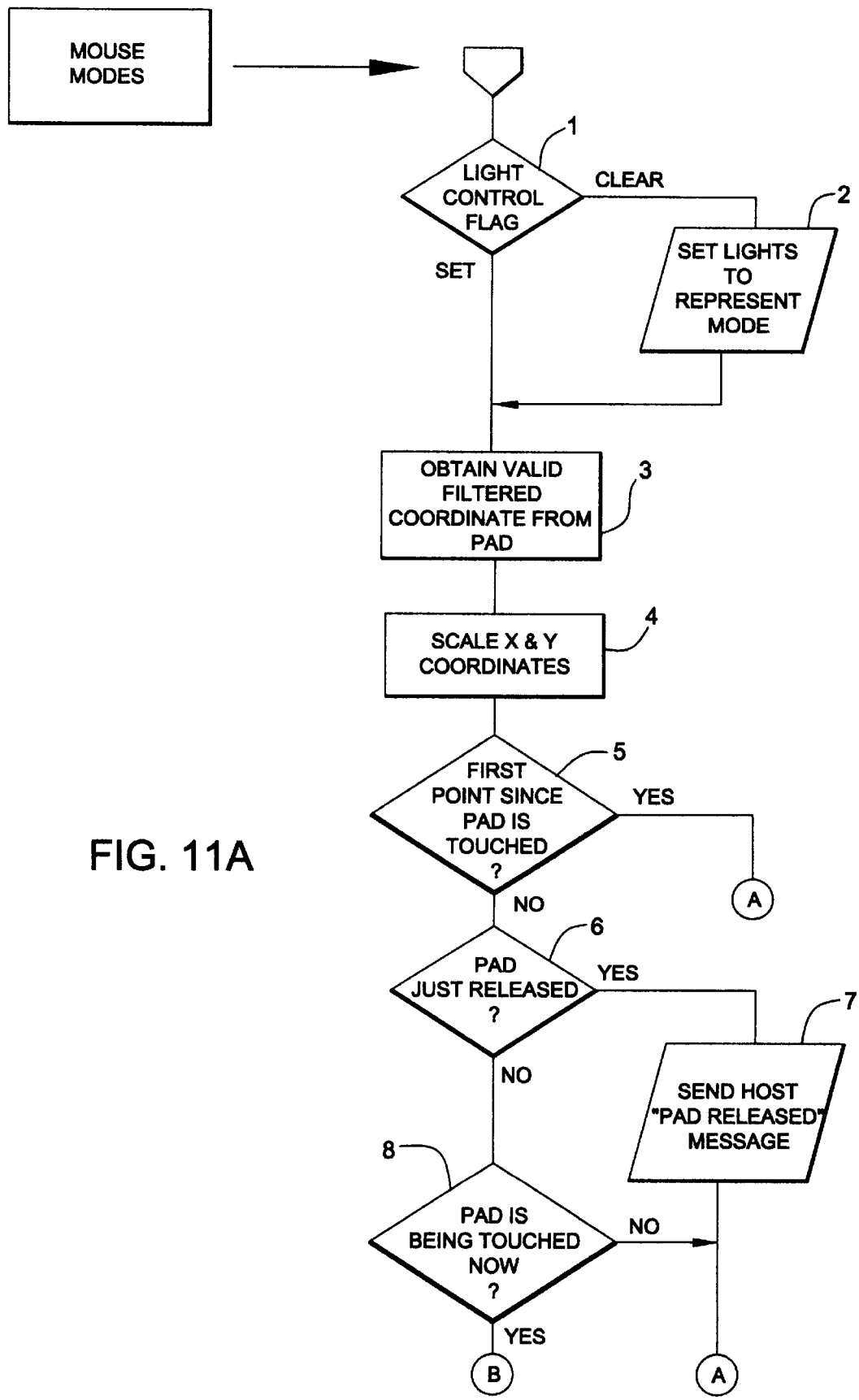
Figure 11B:
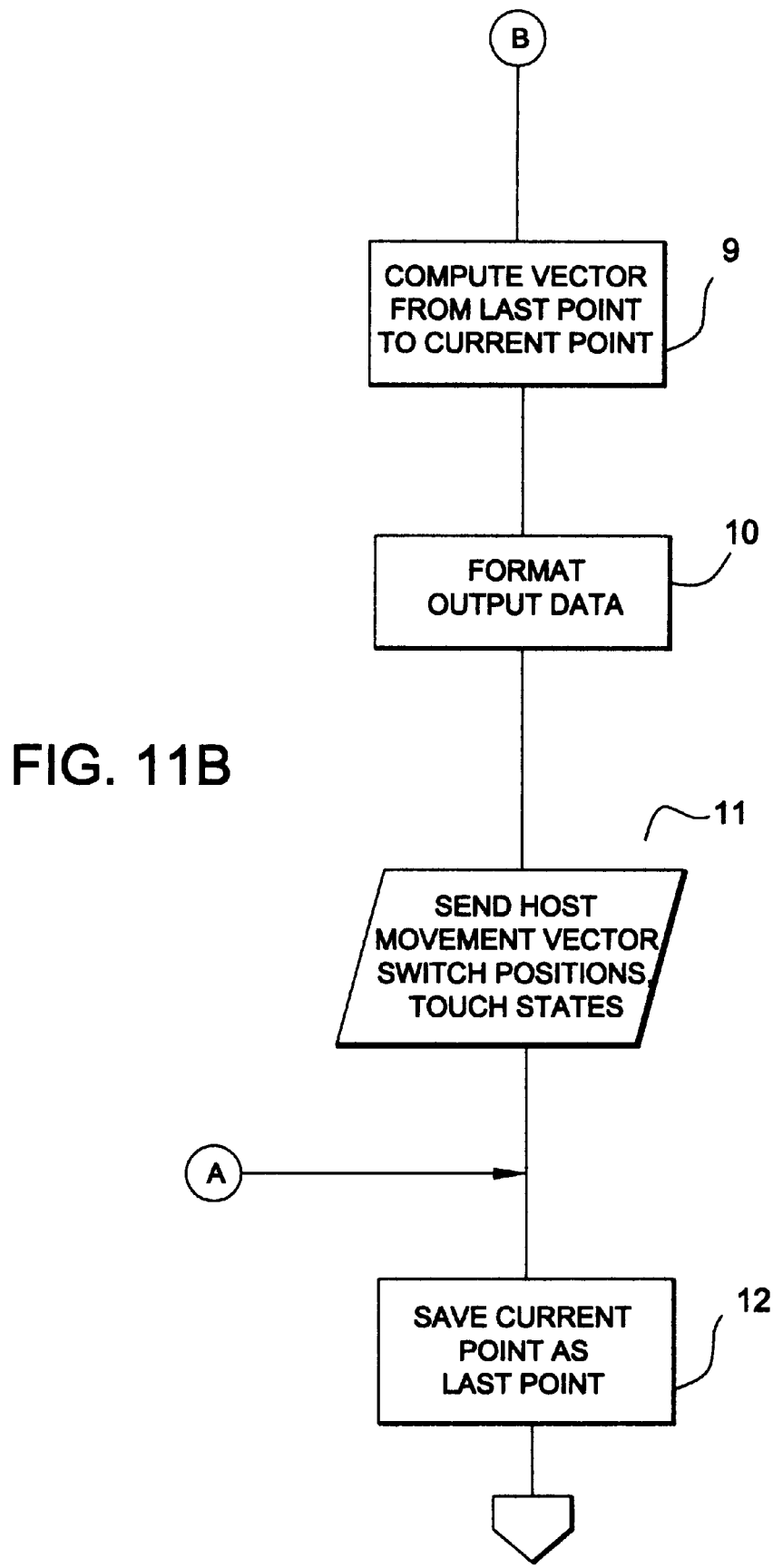

FIG. 11 is a flow chart of the mouse mode subroutine identified in block 7 of FIG. 8. In block 1 of the subroutine, the light control flags are interrogated to determine if they are set to indicate the mouse mode. If the status lamps are not set, the subroutine moves to block 2 and sets the lamp accordingly. The subroutine then proceeds to block 3. If the light control lamps were properly set, the subroutine proceeds directly from block 1 to block 3. In block 3, a pair of X, Y coordinates are obtained from the sensor pad. These coordinates are provided to block 4 where they are scaled to a predetermined range. The scaled coordinates are then supplied to block 5. In block 5, a decision is made whether the X, Y coordinates represent the first point since the pad was last touched. If they do, the subroutine proceeds to block 12 where they are saved as the last entry point. If they do not, the subroutine proceeds to block 6. In block 6, a determination is made whether the pad has just been released. If the pad has just been released, the subroutine moves to block 7 where a "pad release" message is sent to the host computer. In the case where the host computer is an IBM PC, the "pad release" message may be put on the data buss by parallel I/O device U2 via buss transceiver U3 shown in FIG. 3B. The subroutine then moves to block 12. If in block 6, the pad is determined not to be released, the subroutine moves directly from block 6 to block 8 where a determination is made whether the pad is being "touched now". If the pad is not being touched now, the subroutine goes to block 12, otherwise the routine moves to block 9. In block 9, the microcontroller computes a vector from the last X, Y coordinate point to the present X, Y coordinate point. The subroutine then moves to block 10 where the computed data is formatted for transfer to the host computer in block 11. The subroutine then moves to block 12 where the current X, Y coordinate is saved in temporary storage as the last coordinate point.

Figure 12:
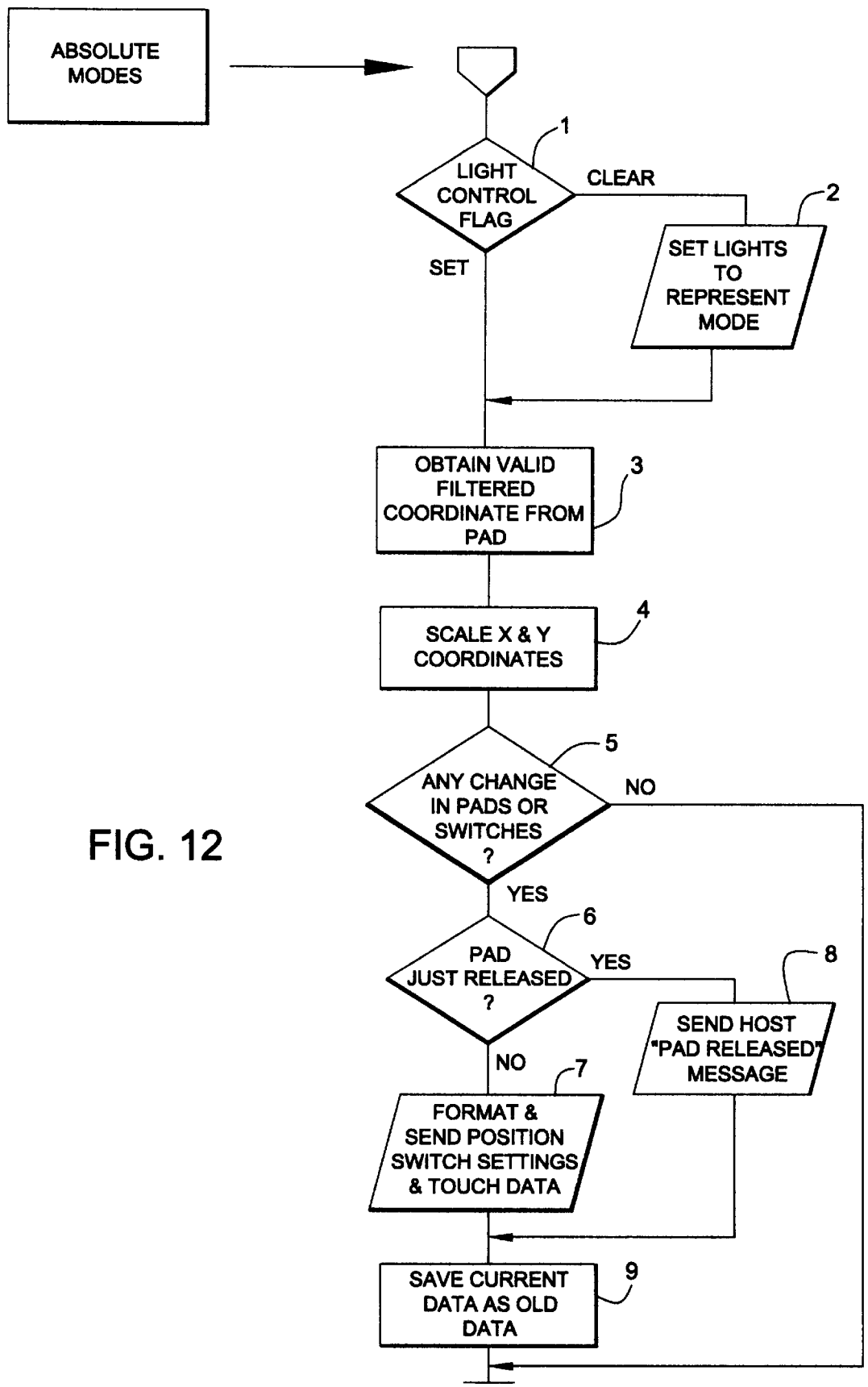
Figure 13:
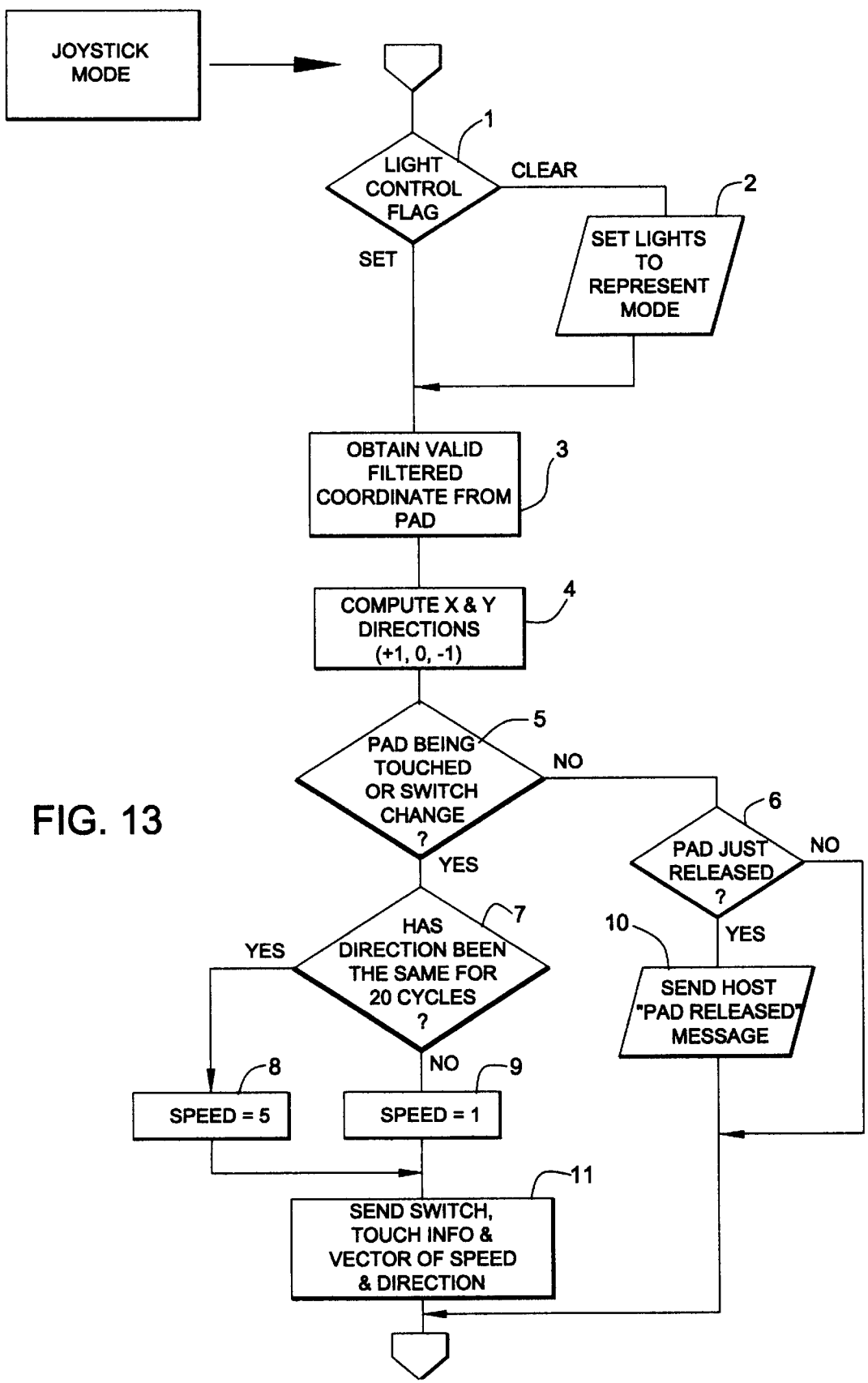
Figure 14:
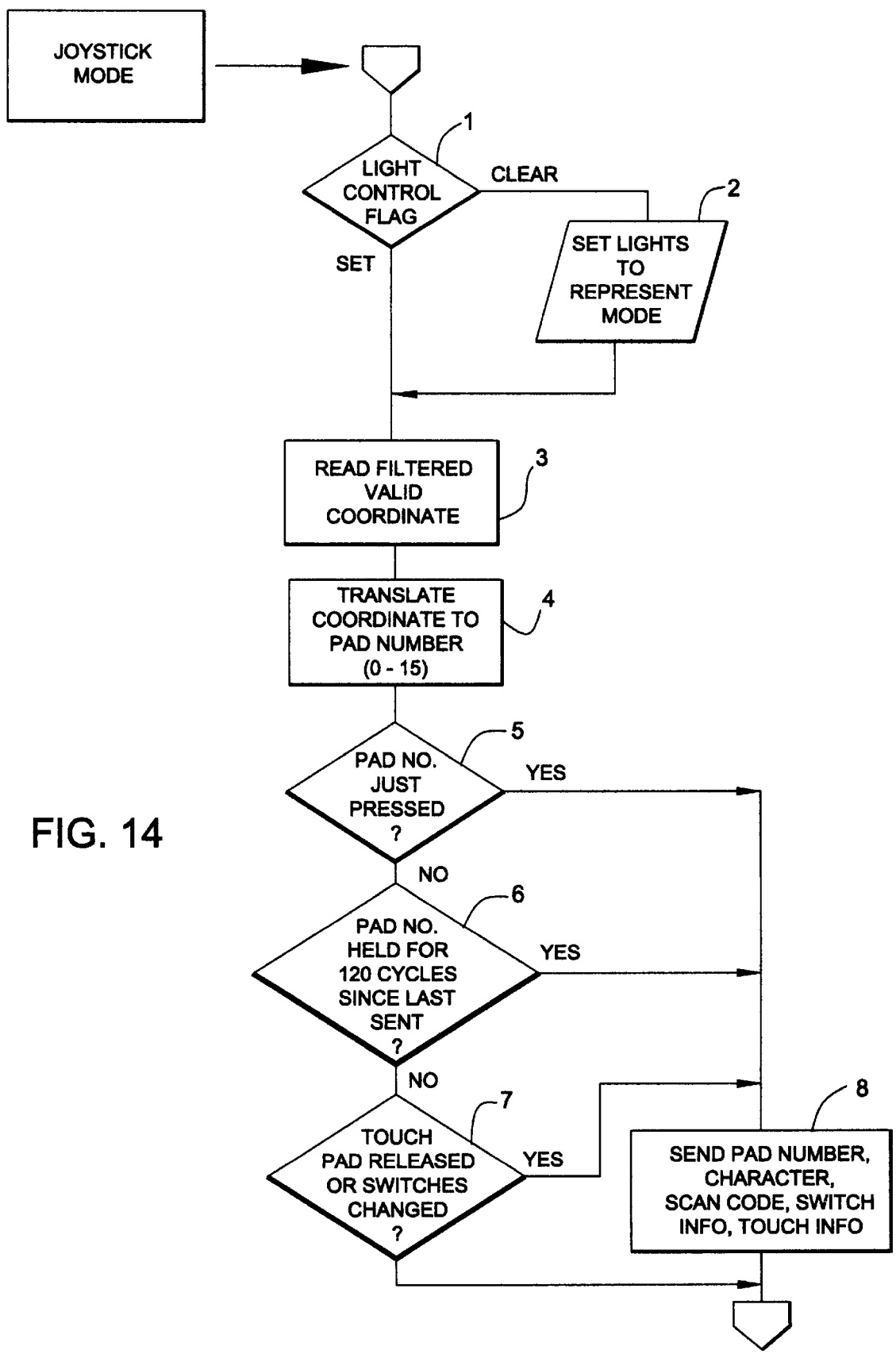
Figure 15:
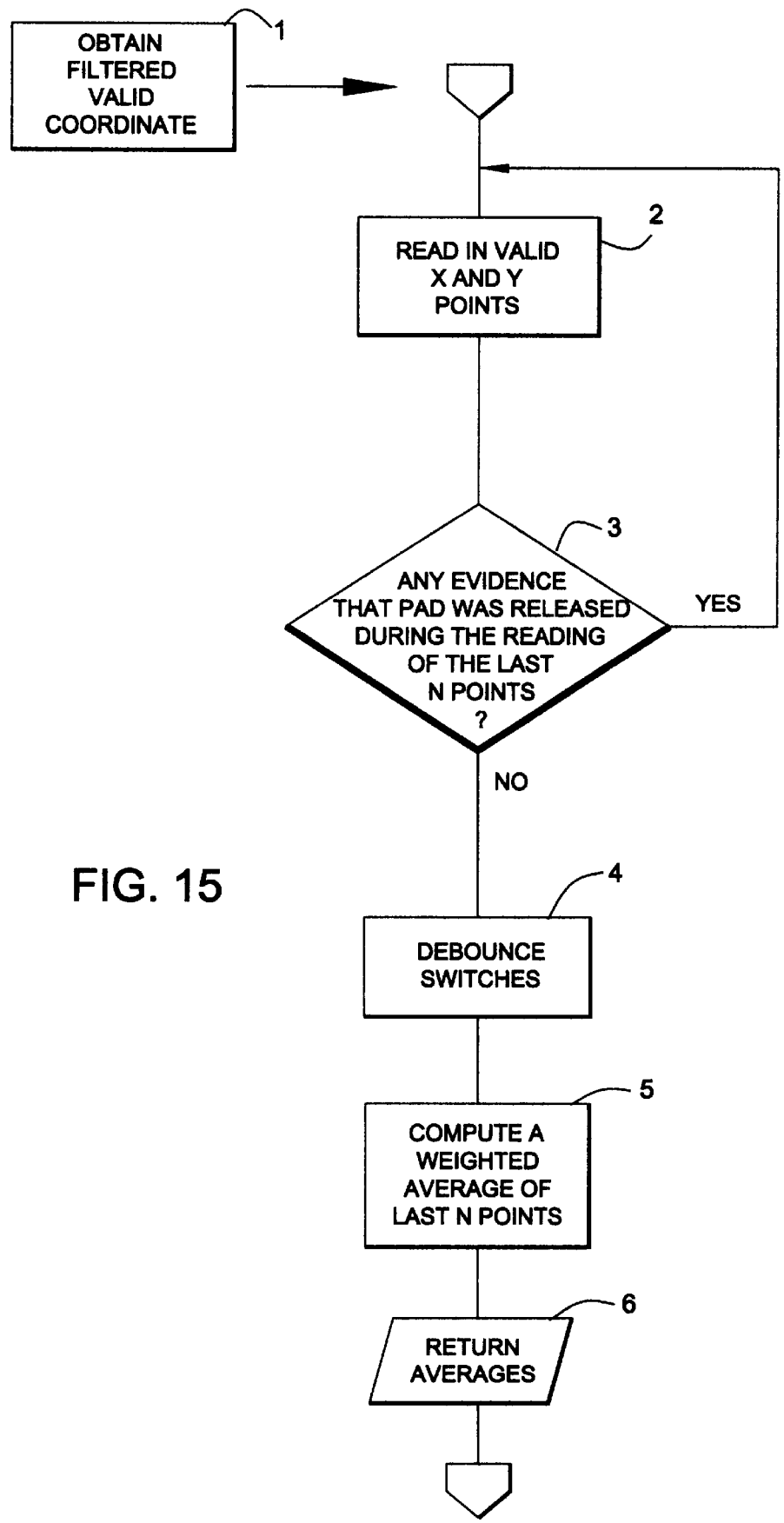
Figure 16:
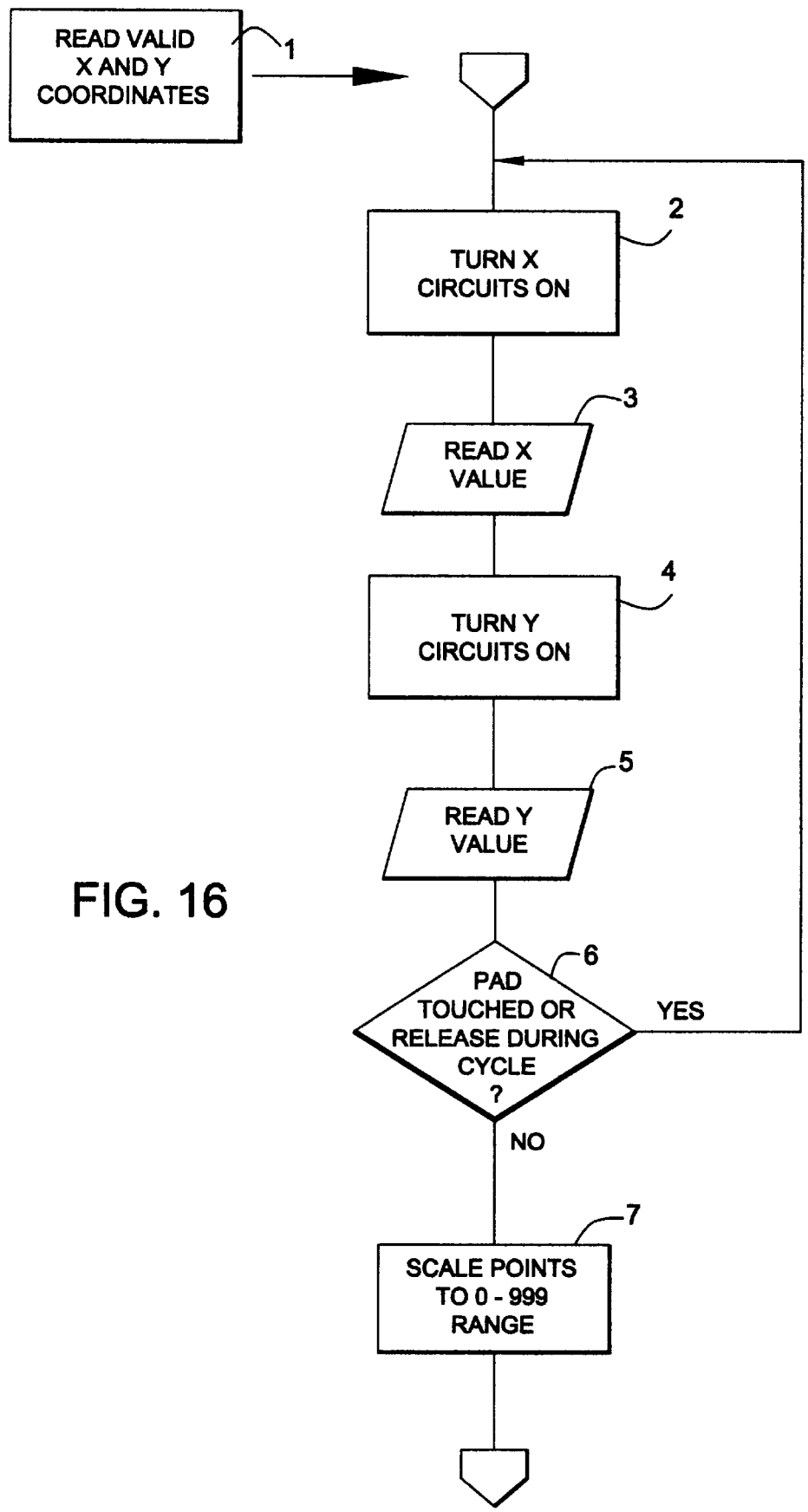

FIGS. 12, 13, and 14 are flow charts of the subroutines for the absolute or touch screen mode, the cursor key or joystick mode and the numeric keypad mode, respectively. FIG. 15 is a flow chart of the subroutines used to obtain a filtered and valid X and Y coordinate signal from sensor pad 1. FIG. 16 is a flow chart of the read subroutine used to implement the read step in block 2 of FIG. 15. These flow charts are believed to be sufficiently clear and understandable that additional discussion will not be presented.

Figure 17A:
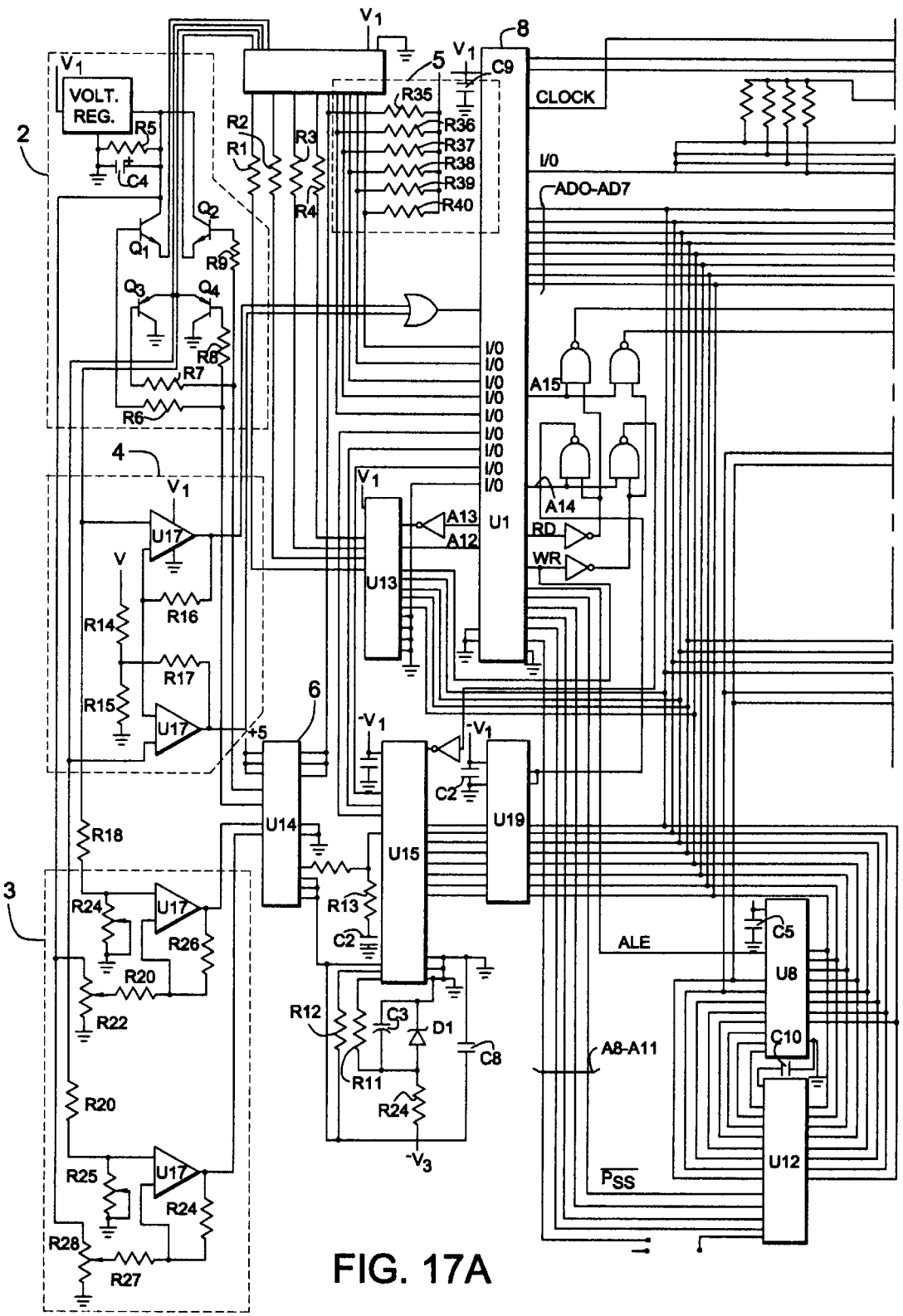
FIG. 17A is a schematic diagram of the multimodal device of FIG. 2.
Figure 17B:
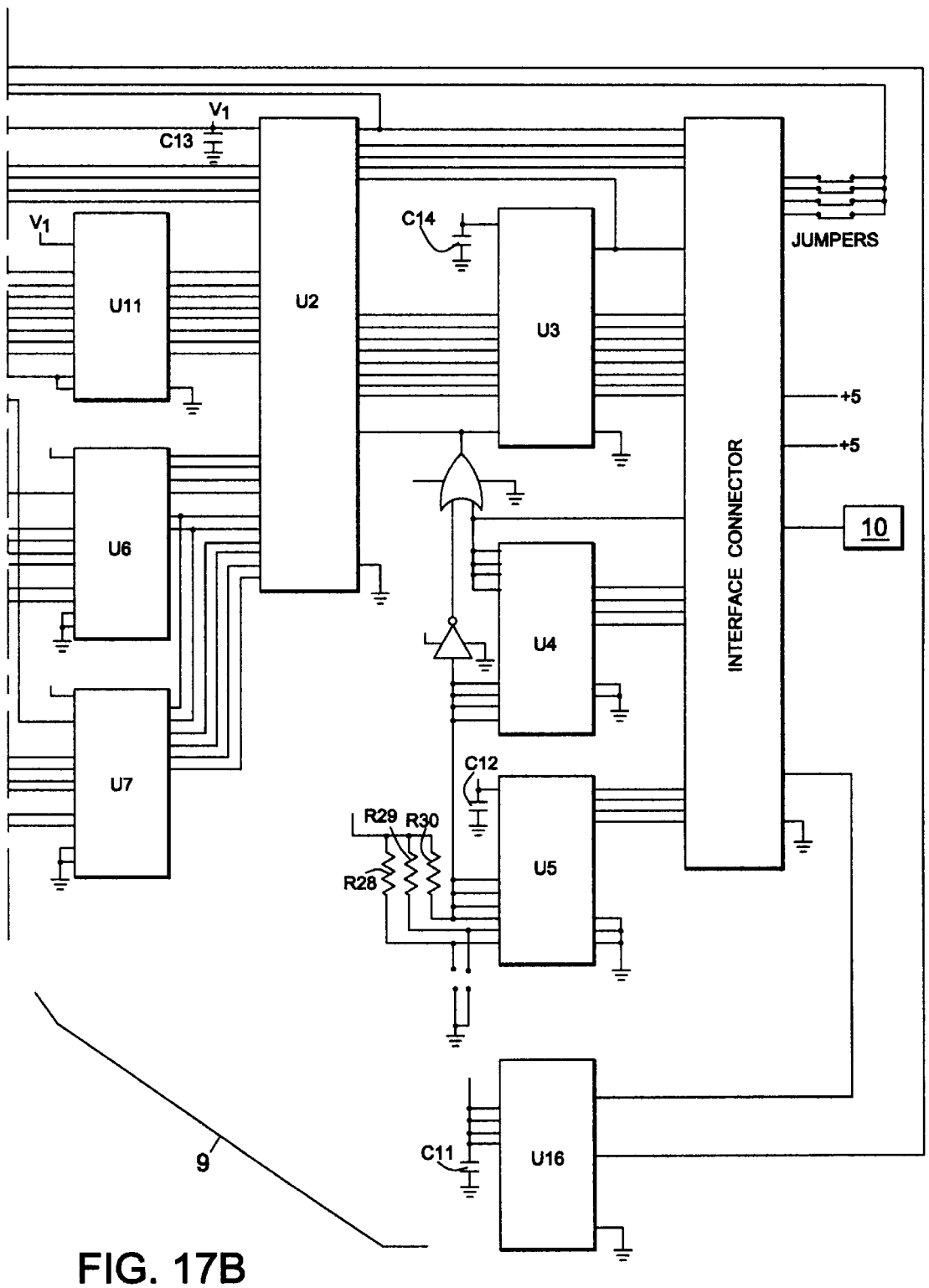
FIG. 17B is a schematic diagram of one example of an interface for connecting the multimodal device of the invention to a host computer.

FIGS. 17A and 17B are schematic diagrams showing one example of how the multimodal device of the present invention may be implemented. The diagrams are sectioned off with reference numbers corresponding to the block diagram of FIG. 2. The component parts shown in FIGS. 17A and 17B are all well known in the prior art. For example, U17s are comparators; U14 is a multiplexer such as a 4053, U13 is a 4-bit register such as a 74LS173A; U15 is an A/D convertor such as an 8704; U1 is a microprocessor such as the Intel 8031; U11 and U14 are buffers such as a 74LS244; U6 and U7 are a registers such as a 74LS670; U8 is an address latch such as a 74LS373; U12 is a ROM such as a 74LS32 which contains the routines shown in FIGS. 8–16; U2 is a parallel I/O such as an 8255; U3 is a buss transceiver such as a 74LS245; U4 and U5 are address decoders such as a 74LS136 and U16 is a divider such as a 74LS73.

This invention has been described in detail in connection with a preferred embodiment, but this embodiment is merely for example only and this invention is not restricted thereto. It will be easily understood by those skilled in the art that other variations and modifications can be easily made within the scope of this invention, as defined by the appended claims.

We claim:

1. A multimodal device for providing to a host computer coordinate signals representative of a position of contact in a two dimensional plane, said device comprising:

a touch sensitive pad for providing at least one coordinate signal representing the position of contact on said pad;

logic means coupled to said pad for reading and interpreting said coordinate signal to determine the position of contact;

mode selection means coupled to said logic means for enabling user selection of one of a plurality of modes of operation of said multimodal device, said logic means processing said coordinate signal in accordance with said selected mode;

interrupt means coupled to said logic means and to said host computer for alerting said host computer that said processed coordinate signal is available for further processing by said host computer; and wherein said plurality of modes including at least one digital mode providing for processing digital input entered into said touch sensitive pad, and further including at least one analog mode providing for processing analog input wherein said logic means continuously processes the coordinate signal corresponding to the position of contact on said touch sensitive pad and provides said coordinate signal as a change in coordinates.

2. The multimodal device for claim 1 wherein said touch sensitive pad comprises two close spaced parallel layers, the opposed surfaces of said layers having superposed electrically resistive portions coupled to respective first and second electrode pairs, said resistive portions being maintained out of electrical contact with each other until the application of localized pressure at any point in said two dimensional plane.

3. The multimodal device of claim 2 further comprising voltage means coupled to said layers for providing a bias voltage to said first and second electrode pairs, said bias voltage producing a voltage gradient across said resistive portions, said voltage gradient being used to provide said coordinate signal.

4. The multimodal device of claim 3 further comprising:

switch means coupled to said voltage means for controlling the application of said bias voltage to said first and second electrode pairs and switch control means coupled to said switch means for controlling said switch means to apply said bias voltage between said first electrode pair and said second electrode pair at a predetermined frequency, said switch control means receiving from said switch means and supplying as an output therefrom a signal representing a first coordinate in said two dimensional plane when said bias voltage is applied to said first electrode pair and a signal representing a second coordinate in said two dimensional plane with said bias voltage is applied to said second electrode pair.

5. The multimodal device of claim 4 further comprising touch detector means coupled to said switch means and to said logic means for producing a touch signal having a first logic state upon the application of localized pressure at any point in said two dimensional plane and a second logic state upon the removal of localized pressure in said two dimensional plane, a transition between said first and second logic states while said logic means is reading said first and second coordinate signals causing said logic means to reread said first and second coordinate signals.

6. The multimodal device of claim 4 wherein said first and second coordinate signals from said switch control means are analog signals.

7. The multimodal device of claim 6 further comprising conversion means coupled to said switch means and said logic means for converting said analog signals to respective digital signals, said digital signals being supplied to said switch means.

8. The multimodal device of claim 4 further comprising scaling means coupled to said switch means and said switch control means, said scaling means scaling said first and second coordinate signals to a predetermined range, said scaled signals being supplied to said switch control means.

9. The multimodal device of claim 4 wherein said switch means includes first and second transistor pairs, the base electrodes of each respective transistor pair being commonly coupled to a respective terminal of said switch control means, the collector electrode of one transistor of said first and second transistor pairs being coupled to said bias voltage and the collector electrode of the other transistor of said first and second transistor pairs being coupled to respective said first and second electrode pairs.

10. The multimodal device of claim 1 further comprising status display means for indicating said selected mode of operation for said device.

11. The multimodal device of claim 1 wherein said mode selection means can be manually controlled by the user and can be automatically controlled by said host computer.

12. The multimodal device of claim 11 wherein automatic control of said mode selection means by said host computer inhibits manual control of said mode selection means by the user.

13. The multimodal device of claim 1 wherein another of said modes is a joystick mode and when in said joystick mode said logic means processes the coordinate signal to correspond to a selected one of a predetermined number of directions on said pad and relative speed of movement between one position of contact on said pad and another position of contact on said pad and provides a corresponding coordinate signal.

14. The multimodal device of claim 1 wherein another of said modes is a numeric key pad mode and when in said numeric key pad mode said logic means processes the coordinate signal to associate a selected one of a plurality of numeric key pad functions with said coordinate signal in accordance with the position of contact on said pad.

15. An intelligent multimodal peripheral device for providing to a host apparatus coordinate signals representative of a position of contact in a two dimensional plane on said device, said device comprising:

a touch sensitive pad for providing at least one coordinate signal representing the position of contact on said pad, said coordinate signal being provided in response to said contact being made on said pad;

logic means coupled to said pad for reading and interpreting said one coordinate signal to determine the position of contact;

mode selection means coupled to said logic means for selecting one of a plurality of modes of operation for said peripheral device, said logic means processing said one coordinate signal in accordance with said selected mode;

output means coupled to said logic means for receiving said processed coordinate signal; and interrupt means coupled to said output means and to said host apparatus for alerting said host apparatus that said output means contains said processed coordinate signal whereby said processed coordinate signal is made available for further processing by said host computer.

* * * * *